(12) United States Patent
Chehreghani

(10) Patent No.: US 9,805,138 B2
(45) Date of Patent: Oct. 31, 2017

(54) EFFICIENT CALCULATION OF ALL-PAIR PATH-BASED DISTANCE MEASURES

(71) Applicant: Xerox Corporation, Norwalk, CT (US)

(72) Inventor: Morteza Haghir Chehreghani, Montbonnot-St-Martin (FR)

(73) Assignee: XEROX CORPORATION, Norwalk, CT (US)

( * ) Notice: Subject to any disclaimer, the term of this patent is extended or adjusted under 35 U.S.C. 154(b) by 270 days.

(21) Appl. No.: 14/616,032

(22) Filed: Feb. 6, 2015

(65) Prior Publication Data
US 2016/0232254 A1 Aug. 11, 2016

(51) Int. Cl.
G06F 17/30 (2006.01)
G06F 17/10 (2006.01)

(52) U.S. Cl.
CPC ........ *G06F 17/30958* (2013.01); *G06F 17/10* (2013.01)

(58) Field of Classification Search
None
See application file for complete search history.

(56) References Cited

PUBLICATIONS

Author: Kershenbaum et al.; Title: "Computing minimum spanning trees efficiently"; Date: Aug. 1, 1972; Publisher: ACM; Pertinent pp. 518-527 (as attached).*

Author: Nesetril et al.; Title:"On nowhere dense graphs"; Date: May 2011; Publisher: European Journal of Combinatorics; Volume: vol. 32 Issue 4; Pertinent pp. 1-32 (as attached).*
Kim, et al., "Walking on Minimax Paths for κ—NN Search," Proceedings of the 27$^{th}$ AAAI Conference on Artificial Intelligence, pp. 518-525 (2013).
Fouss, et al., "Random-walk computation of similarities between nodes of a graph, with application to collaborative recommendation," IEEE Trans. on Knowl. and Data Eng., vol. 19, No. 3, pp. 1-31 (2007).
Prim, "Shortest Connection Networks and Some Generalizations," The Bell Systems Technical Journal, vol. 36, No. 6, pp. 1389-1401 (1957).
Ng, et al., On spectral clustering: Analysis and an algorithm, Advances in Neural Information Processing Systems 14, pp. 849-856 (2001).
Yen, et al., "A Family of Dissimilarity Measures between Nodes Generalizing both the shortest path and the Commute-time Distances," KDD, pp. 785-793 (2008).

(Continued)

*Primary Examiner* — Anh Tai Tran
(74) *Attorney, Agent, or Firm* — Fay Sharpe LLP

(57) ABSTRACT

A method is disclosed for computing a path-based distance between a pair of nodes in an undirected graph comprising a set of nodes and a set of edges connecting pairs of nodes in the undirected graph with each edge having an edge weight. The method includes: computing a minimum spanning tree (MST) over the undirected graph; computing a path-based distance between the pair of nodes in the MST; and setting the path-based distance between the pair of nodes in the undirected graph equal to the path-based distance between the pair of nodes in the MST. The path-based distance between the pair of nodes in the MST is computed as the largest edge weight along the only path between the pair of nodes in the minimum spanning tree. A similarity matrix may be constructed from the path-based distances, and used for spectral clustering.

18 Claims, 7 Drawing Sheets

(56) References Cited

PUBLICATIONS

Von Luxburg, "A Tutorial on Spectral Clustering," Statistics and Computing, vol. 17, No. 4, pp. 395-416 (2007).
Fischer, et al., "Path-based clustering for grouping of smooth curves and texture segmentation," IEEE Trans. Pattern Anal. Mach. Intell., vol. 25, No. 5, pp. 513-518 (2003).
Gabow, et al., "Efficient Algorithms for Finding Minimum Spanning Trees in Undirected and Directed Graphs," Combinatorica, vol. 6, No. 2, pp. 109-122 (1986).
Chebotarev, "A Class of Graph-Geodetic Distances Generalizing the Shortest-Path and the Resistance Distances," Discrete Appl. Math., vol. 159, No. 5, pp. 295-302 (2011).
Chang, "Robust path-based spectral clustering," Pattern Recogn., vol. 41, No. 1, pp. 191-203 (2008).
Hu, "The Maximum Capacity Route Problem," Operations Research, vol. 9, No. 6, pp. 898-900 (1961).
Fischer, et al., "Bagging for Path-Based Clustering," IEEE Transaction on Pattern Analysis and Machine Intelligence, vol. 25, No. 11, pp. 1-6 (2003).
Fulkerson, et al., "Flow networks and combinatorial operations research," The American Mathematical Monthly, 73; pp. 115-138 (1966).
Chazelle, "A Minimum Spanning Tree Algorithm with Inverse-Ackermann Type Complexity," NECI Research Tech Report, Journal of the ACM, vol. 47, No. 6, pp. 1028-1047 (1999).

\* cited by examiner

EFFICIENT CALCULATION OF ALL-PAIR PATH-BASED DISTANCE MEASURES

BACKGROUND

The following relates to clustering and classification apparatuses and methods, machine learning apparatuses and methods, social media systems and methods, and related arts.

Numerous computer-based data processing apparatuses such as document management and retrieval systems, machine learning systems, and so forth manage and/or retrieve data objects based in part on quantitative comparisons between pairs of objects. For example, in clustering similar objects are grouped together into clusters, while a typical retrieval system task is to retrieve the most similar object(s) to a query object. In these applications, "similarity" is measured by quantitative comparisons, typically in the form of pairwise distance measures. For objects that can be represented as vectors of scalar features, a commonly used distance measure is the Euclidean distance. For other types of objects, however, a Euclidean distance may not be readily employed, and other distance metrics are known. Even if a Euclidean distance is usable, it may produce less optimal results as compared with other types of distance measures. Depending on the application, other distance measures such as the Pearson correlation, cosine similarity, Mahalanobis distance, Minkowski distance, Hamming distance, or edit distance may be usable, but these tend to be dependent upon the specific structure of the data, which may not be known or properly assumed.

Depending upon the task, it may be advantageous to pre-compute the distance measures for some or all possible object pairs. If there are N objects in a set, the pre-computed distances are suitably stored in an N×N matrix sometimes referred to as a "similarity matrix". A problem arises in terms of the high computational complexity of computing the similarity matrix. While a Euclidean distance is rapidly computed, some other types of distances have computational times that scale superlinearly with the number of objects N in the set, e.g. have computational times of $O(N^3)$ in some cases. This makes computing the N×N similarity matrix computationally challenging for large values of N.

It would be useful to provide apparatuses such as clustering apparatuses, retrieval apparatuses, machine learning apparatuses, and so forth, with a distance metric component that rapidly computes pairwise distance measures that emphasize structure in the data but also do not make unnecessary assumptions regarding that structure.

Disclosed in the following are improved data mining techniques that provide various benefits as disclosed herein.

BRIEF DESCRIPTION

In some embodiments disclosed herein, an apparatus for comparing objects is disclosed. The apparatus comprises a distance measure component configured to compute a path-based distance $D_{ij}^{path}$ between an object i and an object j in an undirected graph $\mathcal{G}$ (O,E) where O is a set of N objects including the object i and the object j and E is a set of edges connecting pairs of objects in the undirected graph $\mathcal{G}$ with each edge having an edge weight. The distance measure component comprises an electronic data processing device programmed to compute the path-based distance $D_{ij}^{path}$ by operations including (i) computing a minimum spanning tree over the undirected graph $\mathcal{G}$ and (ii) computing a path-based distance between the object i and the object j in the minimum spanning tree and (iii) setting the path-based distance $D_{ij}^{path}$ between the object i and the object j in the undirected graph $\mathcal{G}$ equal to the path-based distance between the object i and the object j in the minimum spanning tree. The apparatus may further comprise a clustering component configured to construct clusters comprising sub-sets of objects of the set of objects O. The clustering component comprises an electronic data processing device programmed to perform a clustering process including the operations of invoking the distance measure component to compute path-based distances between pairs of objects of the set of objects O and grouping similar objects into said clusters based on the computed path-based distances.

In some embodiments disclosed herein, a method is disclosed of computing a path-based distance $D_{ij}^{path}$ between an object i and an object j in an undirected graph $\mathcal{G}$ (O,E) where O is a set of N objects including the object i and the object j and E is a set of edges connecting pairs of objects in the undirected graph $\mathcal{G}$ with each edge having an edge weight and the path-based distance $D_{ij}^{path}$ is defined as $$D_{ij}^{path} = \min_{r \in \mathcal{R}_{ij}(O)} \left\{ \max_{1 \le l \le |r|} e_l \right\}$$

where $\mathcal{R}_{ij}(O)$ is the set of all routes between the object i and the object j in the undirected graph $\mathcal{G}$, the route r comprises a sequence of edges l=1, . . . , |r|, and $e_l$ is the edge weight of the $l^{th}$ edge along the route. The disclosed method comprises: (i) computing a minimum spanning tree over the undirected graph $\mathcal{G}$; (ii) computing a path-based distance between the object i and the object j in the minimum spanning tree; and (iii) setting the path-based distance $D_{ij}^{path}$ between the object i and the object j in the undirected graph $\mathcal{G}$ equal to the path-based distance between the object i and the object j in the minimum spanning tree. The operations (i), (ii), and (iii) are performed by an electronic data processing device programmed to perform the operations (i), (ii), and (iii). The operation (iii) may comprise computing the path-based distance between the object i and the object j in the minimum spanning tree as $\max_{1 \le l \le |r_{ij}|} \{e_l\}$ where $r_{ij}$ is the only path from the object i to the object j in the minimum spanning tree and the only path $r_{ij}$ includes $|r_{ij}|$ edges with $e_l$ denoting the edge weight of the $l^{th}$ edge along the only path $r_{ij}$. The method may further include (iv) repeating the operations (ii) and (iii), but not repeating the operation (i), to compute the path-based distances $D_{ij}^{path}$ for all object pairs in the set of objects O.

In some embodiments disclosed herein, a non-transitory storage medium is disclosed, which encodes instructions readable and executable by an electronic data processing device to perform a method for computing a path-based distance between a pair of nodes in an undirected graph comprising a set of nodes and a set of edges connecting pairs of nodes in the undirected graph with each edge having an edge weight. The encoded method comprises: (i) computing a minimum spanning tree over the undirected graph; (ii) computing a path-based distance between the pair of nodes in the minimum spanning tree; and (iii) setting the path-based distance between the pair of nodes in the undirected graph equal to the path-based distance between the pair of nodes in the minimum spanning tree. Advantageously, the operation (ii) comprises computing the path-based distance between the pair of nodes in the minimum spanning tree as the largest edge weight along the only path between the pair of nodes in the minimum spanning tree.

DETAILED DESCRIPTION

Figure 1:
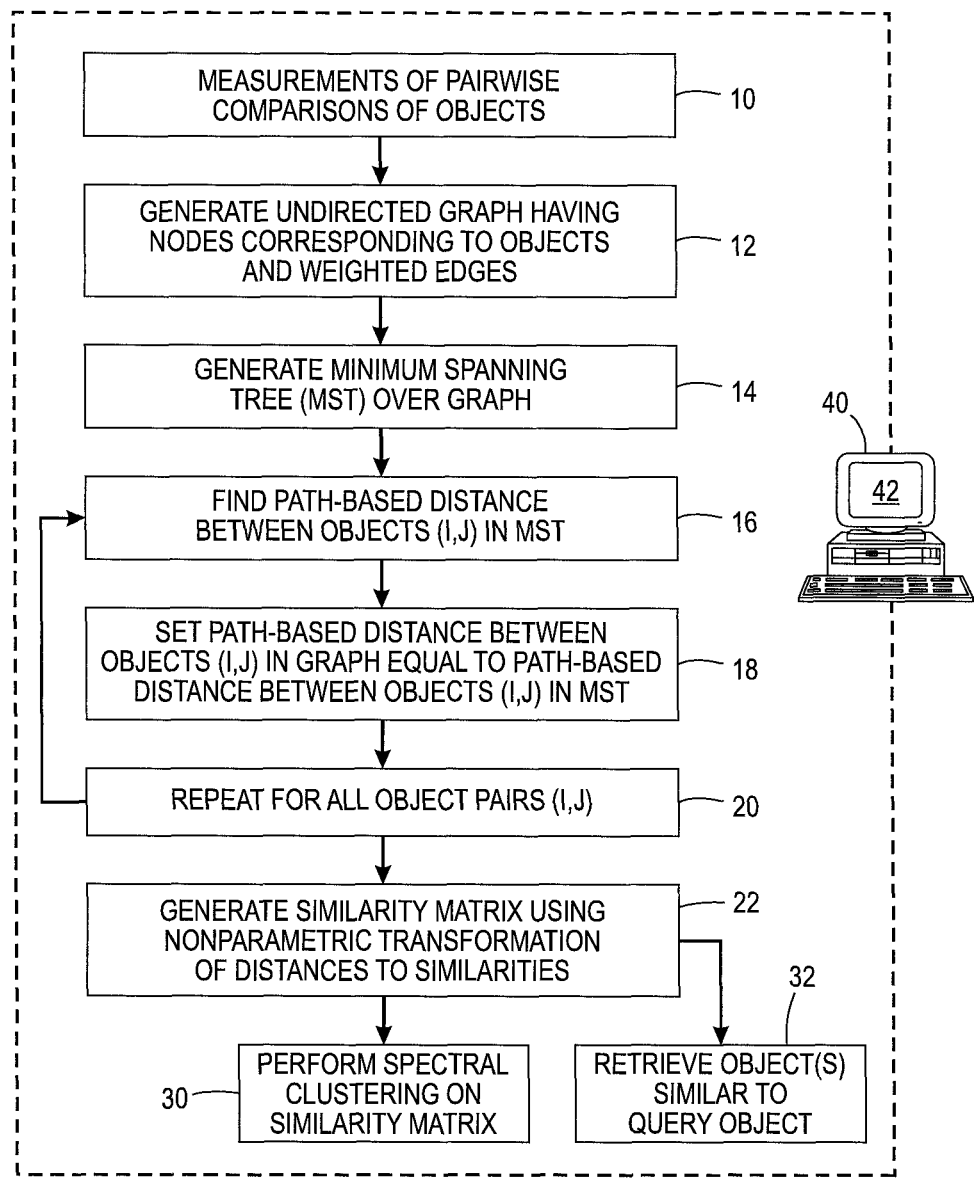
FIG. 1 diagrammatically illustrates a path-based distance measure component as disclosed herein, and illustrative applications thereof including clustering and document retrieval.

Vector-based object representation is arguably the most common way for data representation in many applications. For example, a term frequency-inverse document frequency (tf-idf) representation for text-based documents employs a vector whose elements correspond to vocabulary words and have values indicative of frequency of occurrence in the represented documents. Various n-gram vector representations are also sometimes used for describing text documents. These types of representation tend to be of limited effectiveness when dealing with short texts due to sparsity and presence of noisy features.

Graph-based representations can provide more flexibility in defining the relations between objects, and can incorporate different sources of information. Vector representations can be considered as a special case of graph representation in which the pairwise measures are computed as vector distances, for example by squared Euclidean distances.

A diverse range of similarity (distance) measures available in the literature. Most of these measures make some assumption about the underlying structure in the data, e.g. the objects follow a squared Euclidean distance. The (squared) Euclidean distance is a common distance measure used for structure analysis in many machine learning applications. This choice is, however, optimized for underlying structures that are spherical. Other distance measures such as Pearson correlation, Cosine similarity, Mahalanobis, Minkowski, Hamming and edit distances are known, each of which relies on some specific assumption. For example, Pearson correlation is appropriate for temporal and sequential data, while Mahalanobis distance normalizes the spherical distances by structure-specific covariances. However, in many applications, the structure is complex such that making any explicit assumption is unrealistic. The structure may be of arbitrary shape, and/or might not follow a fixed a priori assumption.

A graph-based representation may be notated as follows. Let O be a set of N objects with corresponding measurements. The measurements can be either of two types: (i) objects directly correspond to the measurements, i.e. the $i^{th}$ object is described by the measurement vector; or (ii) the measurements are pairwise distances between objects. In the first case, the objects O are directly characterized by the measurements. In the second case, a graph $\mathcal{G}(O,E)$ with edges labeled by distance measurements $e_{ij} \in E$ characterizes the set of objects O. In this notation, pairs of objects are denoted $(i,j)$, $1 \leq i \leq N$, $1 \leq j \leq N$.

More generally, in cases is considered herein a set of N objects O is represented by an undirected graph $\mathcal{G}(O,E)$ where E is a set of edges connecting pairs of objects in the undirected graph $\mathcal{G}$ with each edge having an edge weight. Such a graph representation of the set of objects O may be generated by measuring the edge values for pairs of objects, or by measuring an object representation (e.g. feature vector) for objects from which the edge values may be computed for pairs of objects.

Such a graph representation opens up the possibility of distance measures that more effectively capture the structure. In general, this entails a distance measure between objects i and j that depends, not only on those objects, but also on neighboring objects in some fashion.

For example, a category of distance measures, called link-based measures, take into account all the routes between the nodes i and j. The route-specific distance between nodes i and j is computed by summing the edge weights on this route. The link-based distance between nodes i and j is then calculated by summing up the route-specific measures of all routes between them. Such a distance measure better captures arbitrarily shaped clusters compared to measures such as Euclidean or Mahalobis distances. Link-based measures are often obtained by inverting the Laplacian of matrix. However, computing all pair link-based distances entails inverting an N×N matrix, which yields $O(N^3)$ running time, which may be impractical for large scale datasets.

A rather similar distance measure, called the path-based distance measure, is computed as the smallest largest gap among different routes between the objects. In the context of an undirected graph $\mathcal{G}(O,E)$ where O is a set of N objects and E is a set of edges connecting pairs of objects in the undirected graph $\mathcal{G}$ with each edge having an edge weight, the path-based distance $D_{ij}^{path}$ between objects i and j (both belonging to O, and represented by nodes in $\mathcal{G}$) is defined as follows:

$$D_{ij}^{path} = \min_{r \in \mathcal{R}_{ij}(O)} \left\{ \max_{1 \leq l \leq |r|} e_l \right\} \qquad (1)$$

where $\mathcal{R}_{ij}(O)$ is the set of all routes between the object i and the object j in the undirected graph $\mathcal{G}$, the route r comprises a sequence of edges $l=1, \ldots, |r|$, and $e_l$ is the edge weight of the $l^{th}$ edge along the route r. In Expression (1), the max term inside the braces determines the largest gap for the route r (where "largest gap" means the edge with the largest edge weight e along the route r). The outer min term then finds the smallest largest gap amongst all routes from i to j (that is, the smallest largest gap in the set of routes $\mathcal{R}_{ij}(O)$).

The path-based distance can capture structure of the data set represented by the graph $\mathcal{G}$ more effectively than distances that are computed solely based on the objects of the pair by itself. This can be seen in one way as follows. If the path-based distance between objects i and j is small, then it follows that there is no large empty gap between the objects i and j in the graph. If there is a large gap between the objects, it is not "empty"—rather, there are a number of intervening objects via which a route can be defined with a small largest gap. Thus, a small path-based distance suggests the objects i and j are part of a common cluster. On the other hand, if there is a large empty gap between the objects i and j, such that the smallest largest gap among the different routes is large (leading to a large path-based distance), this suggests the objects i and j are in different structures that are spaced apart by a gap that contains no objects. The objects i and j are thus likely to be in different clusters, which is appropriately indicated by the large path-based distance.

A more elaborate way of seeing how the path-based distance captures structure is the following. consider the matrix of pairwise distances E. One can see E as the weights of the edges of a graphs whose nodes are the objects O. One way of generalizing the direct distances $D_{ij}$ is to, over the graph, consider the set of routes $\mathcal{R}_{ij}$ between them, i.e.:

$$D_{ij}^{gen} = \min_{r \in \mathcal{R}_{ij}} \sum_{1 \leq l \leq |r|} e_l \quad (2)$$

In a metric space, the direct distance between i and j is their shortest distance among all possible routes, i.e. $D_{ij} = \min_{r \in \mathcal{R}_{ij}} \sum_{1 \leq l \leq |r|} e_l$ so that $D_{ij} = D_{ij}^{gen}$. The foregoing can be further generalized as follows:

$$D_{ij}^{gen} = \min_{r \in \mathcal{R}_{ij}} \left( \sum_{1 \leq l \leq |r|} (e_l)^\alpha \right)^{\frac{1}{\alpha}} \quad (3)$$

Here, $\alpha$ controls how the partial distances (i.e. edge weights $e_l$) contribute in $D_{ij}^{gen}$. For a small a the contributions are almost equal because the partial distances $e_l^\alpha$ become almost identical. This choice is not effective for a structure detection problem such as clustering, since it yields a uniform distribution over the pairwise distances and thereby hides the underlying structure. A large $\alpha$, on the other hand, discriminates the structures, and therefore better identifies the cluster boundaries. In the limit $\alpha \to \infty$ the largest $e_l^\alpha$ becomes dominant and the other components are discarded. Therefore, in the limit:

$$D_{ij}^{gen} = \min_{r \in \mathcal{R}_{ij}} \left( \sum_{1 \leq l \leq |r|} (e_l)^\alpha \right)^{\frac{1}{\alpha}} \to \min_{r \in \mathcal{R}_{ij}} \left\{ \max_{1 \leq l \leq |r|} e_l \right\} \text{ as } \alpha \to \infty \quad (4)$$

where the right-most limit corresponds to the path-based distance of Expression (1). Thus, the natural distance selection principle obtained with increasing $\alpha$ ultimately yields the path-based distance.

A straightforward approach to compute all-pairs path-based distances (that is, the path-based distances $D_{ij}^{path}$ for all object pairs in the set of objects O) is to use a variant of the Floyd-Warshall algorithm. However, the running time of this algorithm is $O(N^3)$, which may be impractical for processing large data sets. It is recognized herein that a significant aspect of the computational difficulty arises because evaluation of Expression (1) requires searching over the set of routes $\mathcal{R}_{ij}$ between the objects i and j, which may be large.

Disclosed herein is a more efficient approach for computing the path-based distances for all pairs of the set of objects O. The disclosed approach is based on extracting a minimum spanning tree ("MST") over the underlying graph $\mathcal{G}$ (O,E) and then computing all of the path-based distances on the MST. As shown herein, the path-based distance between objects i and j in the MST is equal to the path-based distance $D_{ij}^{path}$ in the graph $\mathcal{G}$ (e.g., as given in Expression (1)). However, because a tree has no cycles, there is exactly one route between objects i and j in the MST, and so the outer min component of Expression (1) is effectively removed.

To further elaborate, the undirected graph $\mathcal{G}$ (O,E) is considered, where O is a set of N objects and E is a set of edges connecting pairs of objects in the undirected graph $\mathcal{G}$. Each edge has an associated edge weight. Each object in the set of objects O is represented by a corresponding node of the graph $\mathcal{G}$. For conciseness of notation, the terms "object" and "node" are used interchangeably herein unless it is useful to distinguish between the object and its representative graph node. It is also noted that the term "vertex" is sometimes substituted for "node". As just previously summarized, techniques disclosed herein for efficiently computing path-based distances are premised on construction of a minimum spanning tree that spans the graph $\mathcal{G}$. In order to further discuss these techniques, some graph theory is reviewed in the following.

In graph theory, a "cycle" is a route in an undirected graph that connects a node with itself. That is, starting at a given node and moving along edges of the graph from node to node (without reversing direction at any point) it is possible to arrive back at the starting node. In general, the undirected graph $\mathcal{G}$ may, and in general does, include cycles, and possibly many cycles. The set of one or more routes between nodes i and j in the graph $\mathcal{G}$ (there must be at least one route since $\mathcal{G}$ is a connected graph) is denoted $\mathcal{R}_{ij}$. Note also that in general there may be more than one spanning tree that spans the graph $\mathcal{G}$.

In graph theory, a "connected graph" means that there is at least one route between every pair of objects (i,j) in the graph—that is, starting from object i it must be possible to follow a sequence of one or more edges of the graph from node to node and thereby reach the object j, and this holds for every pair of objects in the connected graph. The undirected graph $\mathcal{G}$ is assumed herein to be a connected graph.

In graph theory, a spanning tree is a sub-graph of the graph $\mathcal{G}$ which (1) connects with (i.e. "spans") all nodes/objects of the set of objects O; and (2) does not include any cycles. For the undirected graph $\mathcal{G}$ (O,E) to be spanned by at least one spanning tree, it must be a connected graph, and since the spanning tree connects with all nodes of the graph $\mathcal{G}$ it follows that the spanning tree is also a connected graph. The connectivity property (1) of the spanning tree requires that there is at least one route between every pair of objects (i,j) in the spanning tree. However, a consequence of the no-cycles property (2) of the spanning tree is that for a given pair of nodes (i,j) there is always exactly one route $r_{ij}$ (that is, only a single route $r_{ij}$) in the spanning tree that connects node i to node j. This is because if two routes connected a pair of nodes (i,j), then one could follow the first route from node i to node j and then follow the second route from node j back to node i—but this would define a cycle, which by definition is not present in a spanning tree.

Because the spanning tree is a sub-graph of the undirected graph $\mathcal{G}$, it retains the weights of the weighted edges of the sub-graph. A (total) weight can then be assigned to the spanning tree—the weight of the spanning tree is equal to the sum of the edge weights of all edges in the spanning tree.

A minimum spanning tree ("MST") is defined as a spanning tree with minimum weight—that is, a MST has the lowest sum of edge weights over all its edges of any spanning tree that can be constructed to span the graph $\mathcal{G}$.

It can be shown that if each edge of the undirected graph $\mathcal{G}$ has a unique edge weight compared with all other edges of the graph $\mathcal{G}$, then there is a single unique MST over the graph $\mathcal{G}$. If two or more edges of the graph $\mathcal{G}$ have the same weight, then it is possible to have two (or more) MST's that span the graph $\mathcal{G}$.

As previously noted, the undirected graph $\mathcal{G}$ in general includes cycles, and possibly many cycles. However, in the limiting case in which the graph $\mathcal{G}$ includes no cycles at all, the graph $\mathcal{G}$ is its own spanning tree, and there is only one such spanning tree in this case which is therefore the MST.

The disclosed path-based distance measure implementation is based on the following theorem. Consider an undirected graph $\mathcal{G}$ (O,E) where O is a set of N objects and E is a set of edges connecting pairs of objects in the undirected graph $\mathcal{G}$ with each edge having an edge weight. For any pair of objects i, j∈O, their path-based distance $D_{ij}^{path}$ over the graph $\mathcal{G}$ is identical with their path-based distance over any minimum spanning tree (MST) constructed over the graph $\mathcal{G}$.

With reference to FIG. 1, the foregoing observations are leveraged in the context of a path-based distance measure component as shown in FIG. 1, along with some illustrative applications thereof including clustering and document retrieval. The path-based distance measure component receives a set of measurements 10. In illustrative FIG. 1, the measurements are pairwise comparisons between objects of the set of objects O. It is additionally or alternatively contemplated to measure objects themselves and to compute the pairwise comparisons based on the object values. It should also be noted that the object comparisons of the measurements 10 are not (at least in general) equal to the path-based distances between the objects. It is also noted that the set of measurements 10 may not include all possible pairwise comparisons, indeed in some embodiments the set of measurements may be "sparse", that is, only a few such comparisons are provided for each object. However, to ensure connectedness each object in the set of objects O should be represented in the set of measurements 10 by at least one pairwise comparison with another object in the set O.

In an operation 12, the undirected graph $\mathcal{G}$(O,E) is generated. If the set of measurements 10 are pairwise comparisons, then the undirected graph $\mathcal{G}$ is suitably constructed with the values of edges being set to the corresponding pairwise comparisons—for example, if the set of measurements 10 includes a pairwise comparison of value v between objects i and j, then the graph $\mathcal{G}$ suitably includes an edge connecting objects i and j having edge weight $e_{ij}$=v.

In an operation 14, a minimum spanning tree (MST) is constructed over the graph $\mathcal{G}$. Various MST construction algorithms may be employed, such as the Prim MST construction algorithm, the Kruskal MST construction algorithm, the Boruvka MST construction algorithm, or so forth. As disclosed in greater detail later herein, the Prim MST construction algorithm generally provides most efficient MST construction in the case of a dense graph; whereas, the Kruskal or Boruvka MST construction algorithm generally provides most efficient MST construction in the case of a sparse graph. In some contemplated embodiments of the operation 14, the graph $\mathcal{G}$ output by the operation 12 is classified as either dense or sparse using a suitable threshold T on the edge density. For example, in one approach the undirected graph $\mathcal{G}$ is identified as either a dense graph if the number of edges in the set of edges E is greater than threshold T, or a sparse graph if the number of edges in the set of edges E is at or below threshold T, where the threshold T is in the range N<T<N² (where N is the number of nodes, i.e. the number of objects in the set O). As previously noted, more than one possible MST may be able to be constructed over the graph $\mathcal{G}$—it is sufficient that the operation 14 construct any one MST over the graph $\mathcal{G}$.

In an operation 16, for a pair of objects i,j∈O the path-based distance is computed in the MST. This computation is fast compared with computing the path-based distance in the graph $\mathcal{G}$ because there is only one route between objects i,j in the MST whereas there may be many routes between these nodes in the undirected graph $\mathcal{G}$. In an operation 18, the equivalence disclosed herein of the path-based distance $D_{ij}^{path}$ over the graph $\mathcal{G}$ and the corresponding path-based distance over any MST constructed over the graph $\mathcal{G}$ is leveraged by setting the path-based distance $D_{ij}^{path}$ over the graph $\mathcal{G}$ equal to the path-based distance between nodes i and j in the MST computed in the operation 16.

The operations 14, 16, 18 advantageously provide an efficient mechanism for computing the path-based distance $D_{ij}^{path}$ over the graph $\mathcal{G}$ for a single pair of nodes i,j∈O. However, substantial further efficiency is gained in the case where the path-based distance $D_{ij}^{path}$ over the graph $\mathcal{G}$ is to be computed for a large number of possible pairs of nodes in the object set O, because the same MST computed in the operation 14 can be (re-)used for each such path-based distance computation. Many typical tasks employing path-based distance entail computing the path-based distance for many, most, or even all possible object pairs. For example, in spectral clustering a similarity matrix is processed, which entails computing all-pairs path-based distances. FIG. 1 diagrammatically indicates this benefit by way of repetition operation 20, via which process flow returns to the operation 16 (not to the MST construction operation 14) in order to compute the path-based distance for a "next" pair of objects.

The repetition 20 may in general iterate to compute the all-pairs path-based distances, all leveraging the single MST of operation 14. The resulting path-based distances may be variously used. In illustrative FIG. 1, an operation 22 is performed in which a similarity matrix is generated using a nonparametric transformation of the path-based distances in the graph $\mathcal{G}$. The nonparametric transformation is suitably of the form $A_{ij}=\delta-D_{ij}^{path}$ where $A_{ij}$ is the similarity matrix element corresponding to the path-based distance $D_{ij}^{path}$ and δ is a shift parameter. In some illustrative embodiments disclosed herein, $\delta=\max_{i,j\in O}(D_{ij}^{path})+\min_{i,j\in O}(D_{ij}^{path})$ so that the range of $A_{ij}$ equals the range of $D_{ij}^{path}$ over the set of objects O. More generally, the operation 22 may be any operation that generates the similarity matrix elements such that a larger value of the path-based distance $D_{ij}^{path}$ (that is, greater distance separation) transforms into a smaller value of $A_{ij}$ (that is, less similarity).

The similarity matrix output by the operation 22 may be used for various tasks. In illustrative examples herein, a spectral clustering operation 30 is performed, which entails eigenvalues/eigenvectors analysis of the similarity matrix to perform dimensionality reduction and construct clusters comprising sub-sets of objects of the set of objects O. The clustering process of operation 30 thereby groups similar objects into clusters based on the path-based distances computed in the operations 14, 16, 18, 20.

As another illustrative application, a retrieval process 32 may retrieve objects of the set O that are similar to a "query" object of the set O based on the similarity values stored in the similarity matrix. For example, the retrieval process 32 may retrieve a "top-K" most similar objects, that is, the K objects whose similarity measures $A_{qj}$ (where subscript q denotes the query object) is smallest. It will be appreciated that this processing is efficient as it merely entails stacking and ranking the j similarity matrix elements $A_{q1}, \ldots, A_{qN}$ (excluding the element $A_{qq}$) and retrieving the K smallest values of the stack.

The system of FIG. 1 is suitably implemented by a computer or other electronic data processing device 40 that is programmed to perform the various operations 12, 14, 16, 18, 20, 22, optionally along with clustering operation 30 and/or retrieval operation 32. The computer 40 may be a desktop computer, notebook computer, Internet-based server computer, a cloud-based computing environment comprising a plurality of computers interconnected to define the cloud resource, or so forth. It is noted that in illustrative FIG. 1, the same computer or other electronic data processing device 40 is programmed to perform both the distance measure component operations 12, 14, 16, 18, 20, 22, and the clustering and/or retrieval operation(s) 30, 32. However, it is contemplated to variously divide these operations amongst different computers or electronic data processing devices. For example, one computer may be programmed to perform the distance measure component operations 12, 14, 16, 18, 20, 22, while a separate computer may be programmed to perform the clustering and/or retrieval operation(s) 30, 32.

The system of FIG. 1 may additionally be embodied as a non-transitory storage medium storing instructions that are readable and executable by the computer other electronic data processing device 40 to perform the various operations 12, 14, 16, 18, 20, 22, optionally along with clustering operation 30 and/or retrieval operation 32. The non-transitory storage medium may, for example, comprise a hard disk or other magnetic storage medium, or an optical disk or other optical storage medium, or a solid state drive (SSD), read-only memory (ROM), programmable read-only memory (PROM), flash memory, or other electronic storage medium, various combination(s) thereof, or so forth.

The path-based distance computed by the system of FIG. 1 is premised on the operation 18 in which the path-based distance $D_{ij}^{path}$ over the graph $\mathcal{G}$ is set equal to the path-based distance computed in the MST spanning the graph $\mathcal{G}$. This equivalence, for any pair of objects $i, j \in O$, of the path-based distance $D_{ij}^{path}$ over the graph $\mathcal{G}$ and the corresponding path-based distance over any MST constructed over the graph $\mathcal{G}$, can be shown as follows. Consider the path-based distance between i and j denoted by $D_{ij}^{path}$ and let the edge whose weight is representing the path-based distance be denoted by $e_{i,j}^{path}$. That is, $e_{i,j}^{path}$ is the shortest longest edge (as measured by its weight, also denoted here as $e_{i,j}^{path}$ for compactness) of all routes connecting i and j in the graph $\mathcal{G}$. Two cases are considered.

Figure 2:
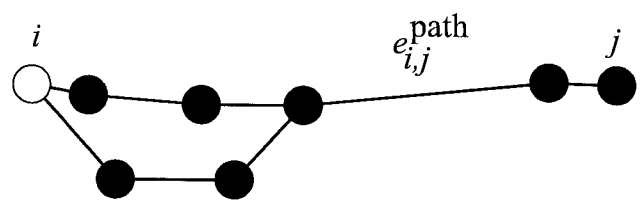
FIGS. 2 and 3 diagrammatically show illustrative sets of nodes in an undirected graph referenced in describing aspects of the path-based distance computation techniques disclosed herein.

In the first case, there is only one route between i and j. This single route is necessarily part of any MST constructed over the graph $\mathcal{G}$. This holds because, otherwise, if some edges for example $e_{i,j}^{path}$ are not selected, then the tree would loose connectivity, i.e. there will be less edges in the tree than N-1. The same rationale holds when there are several routes between i and j, but all of these routes share $e_{i,j}^{path}$ such that $e_{i,j}^{path}$ is the largest edge for all of them. This corresponds to the example shown in FIG. 2. In this case $e_{i,j}^{path}$ will be included in any constructed MST, as otherwise the MST would lose connectivity.

Figure 3:
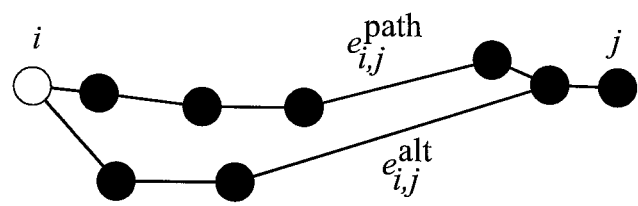

In the second case, there are several routes between i and j in the undirected graph $\mathcal{G}$, and the largest edges are different for at least two of these routes. It is sufficient to show that only the route including $e_{i,j}^{path}$ is selected in constructing any MST. That this is the case is explained with reference to FIG. 3. Consider two routes connecting i and j, one including $e_{i,j}^{path}$ and the other containing $e_{i,j}^{alt}$ which is the largest edge on this alternative route. In this case the MST construction would choose $e_{i,j}^{path}$ rather than $e_{i,j}^{alt}$ due to the following rationale. The existence of two different routes indicates presence of at least one cycle between (and possibly including) nodes i and j of graph $\mathcal{G}$. As a tree cannot include any cycles, one edge of the cycle is eliminated in constructing the tree. In the cycle that includes $e_{i,j}^{path}$, according to the definition of path-based distance, there is at least one edge not smaller than $e_{i,j}^{path}$ (which is $e_{i,j}^{alt}$ in the illustrative diagram of FIG. 3), as otherwise $e_{i,j}^{path}$ would not represent the path-based distance (the minimum of largest gap) between i and j. Thereby the MST construction algorithm keeps $e_{i,j}^{path}$ rather than $e_{i,j}^{alt}$ since this choice leads to a shorter tree (which must be selected when constructing the minimum spanning tree). Notice that the MST construction algorithm cannot discard both $e_{i,j}^{path}$ and $e_{i,j}^{alt}$ since in this case the connectivity would break down.

It is noteworthy that this result is not affected by the choice of a particular MST construction algorithm. Accordingly, the MST construction algorithm can be selected to reduce the computational demand to compute path-based distances.

A lemma arising from the foregoing theorem is the following: the path-based distance between the objects i and j in any MST constructed over the graph $\mathcal{G}$ is the edge with the largest weight on the (single) route connecting i and j—and this largest weight is the same $e_{i,j}^{path}$ representing the path-based distance in the undirected graph $\mathcal{G}$. This lemma arises naturally because, in accord with the just-shown theorem, the tree includes $e_{i,j}^{path}$ in the only route between i and j, and $e_{i,j}^{path}$ is the longest gap (largest weight) along that single path. Written formally, the path-based distance in the graph $\mathcal{G}$ is (from Expression (1)):

$$D_{ij}^{path} = \min_{r \in R_{ij}(0)} \left\{ \max_{1 \leq l \leq |r|} e_l \right\} = e_{i,j}^{path} \text{ in the graph } \mathcal{G} \qquad (5)$$

while in the MST this reduces to:

$$\left(D_{ij}^{path}\right)_{in\ tree} = \max_{1 \leq l \leq |r|} \{e_l\} = e_{i,j}^{path} \text{ in the } MST \text{ over graph } \mathcal{G} \qquad (6)$$

where $r_{ij}$ in Expression (6) denotes the only path from the object i to the object j in the MST. This only path $r_{ij}$ includes $|r_{ij}|$ edges with $e_l$ denoting the edge weight of the $l^{th}$ edge along the only path $r_{ij}$. From the previous theorem, it is known that the $|r_{ij}|$ edges include the edge $e_{i,j}^{path}$ (since it is included in the MST during construction) which is the edge with maximum weight.

With returning reference to FIG. 1, comparing Expression (5) and Expression (6) reveals a substantial advantage of computing path-based distances over a MST, namely that those edges of the graph $\mathcal{G}$ are useful that are already included in a MST over graph $\mathcal{G}$. This leverages the fact that over an arbitrary graph, constructing a MST is computationally more efficient than computing all pair path-based distances and, hence, suggests the procedure of FIG. 1: (1) operation 14 of computing a minimum spanning tree (MST) over the graph $\mathcal{G}$; and (2) operation 16 of extracting the path-based distance between objects i and j in the MST. The path-based distance $D_{ij}^{path}$ between objects i and j in the graph $\mathcal{G}$ is then equal to the path-based distance between objects i and j in the MST (operation 18). Advantageously, it will be noted that if path-based distances are to be computed between a number of different object pairs of the set of objects O, then efficiency is enhanced because the same MST can be used for all these path-based distances (operation 20). In other words, the MST is constructed once, and can then be used to compute path-based distances between any (or all) possible pairs of objects in the set of objects O. By way of illustration, if it is desired to compute a similarity matrix for the set of objects O, this requires computing the path-based distances between all possible pairs of objects in the set of objects O—this can be done with a single constructed MST.

Various approaches for performing the operation 14 of constructing the MST over the graph $\mathcal{G}$ are next described. In accord with the just-shown theorem, any MST construction algorithm ensures that the edges giving the path-based distances between objects (nodes) in the graph $\mathcal{G}$ are retained in the constructed MST.

As an initial example, a uniform approach for constructing MSTs is described. Consider the forest (collection) of subtrees $\{T_p\}$. The distance between the two subtrees $T_p$ and $T_q$ is written as:

$$\Delta T_{pq} = \min_{i \in T_p} \min_{j \in T_q} D_{i,j} \quad (7)$$

Note that $\Delta T_{pq}$ is symmetric, i.e. $\Delta T_{pq} = \Delta T_{qp}$. The nearest subtree from a subtree $T_p$, i.e. $T_{q*}$, is obtained by:

$$\Delta T_{pq*} = \min_{T_q} \Delta T_{pq}, q* \neq p. \quad (8)$$

For some subtree $T_p$, $e_{pq*}$, is the edge representing the nearest subtree from $T_p$, that is:

$$e_{pq*} = \operatorname*{argmin}_{e}\{\Delta T_{pq}\}, q* \neq p. \quad (9)$$

The following lemma can then be shown: Given an undirected graph $\mathcal{G}$(O,E) and the collection of nonempty and disjoint subtrees $\{T_p\}$, assume it is already known that all the subtrees are included in a MST to be constructed on the graph. Then, the edge $e_{pq*}$, should be part of the MST. This lemma can be shown by showing that the absence of $e_{pq*}$, yields a contradiction. Assume $e_{pq*}$, is not included in the MST. Then, by definition, $T_p$ must be connected to some other subtree (due to the connectedness property of MSTs), i.e. there must exist some edge e' selected by the MST where e'>$e_{pq*}$. However, this yields a contradiction since replacement of e' by $e_{pq*}$, forms a shorter tree. Hence, $e_{pq*}$, must be included in the MST.

In showing the immediately preceding lemma, the only assumption made is that replacing an edge of the tree with weight w by an edge of weight w'<w decreases the total weight of the tree. No further assumption, e.g. additivity of the total weight of the tree is made. This lemma therefore provides a generic way to construct a MST. Consider a set of singleton subtrees $T_1, \ldots, T_N$, where each $T_i$ contains only the ith object (node). A greedy MST algorithm, at each step, (i) picks two candidate subtrees, and (ii) combines them via their shortest distance (edge) to build a larger subtree. The procedure continues until only a single subtree with N nodes remains. Several MST construction algorithms, such as the Prim and Kruskal algorithms, differ only in the way they pick the candidate subtrees at each step. The just-shown lemma guarantees that such an algorithm yields an MST of the graph. Every combination step adds a new edge which belongs to the MST.

The Kruskal MST construction algorithm, at each step, picks the pair of subtrees that have minimal distance among all possible pairs of subtrees. However, the Prim MST construction algorithm produces the MST via growing only one subtree, say $T_1$, by attaching a singleton subtree at each step to that, until it contains all the nodes (singleton subtrees).

In order to analyze the impact of MST algorithm, two cases are considered: (i) dense graphs where each node is connected to all the other nodes (or at least many or most nodes are connected to the other nodes), and (ii) sparse graphs where each node is connected to only a few other nodes.

Path-based measures for dense graphs are first considered. A dense graph has many edges (pairwise distances) between its nodes, i.e. the number of precomputed pairwise distances is $O(N^2)$. For such graphs, the Prim algorithm (Robert C. Prim, "Shortest connection networks and some generalizations", The Bell Systems Technical Journal, vol. 36 no. 6 pages 1389-1401 (1957)) suggests an efficient way to compute a MST. This algorithm first initializes the tree with a single random node, then iteratively at each step, among unselected nodes, adds a new node which has the minimum distance to one of the nodes of the tree. A straightforward implementation of this algorithm renders a linear search to find the minimum distance at each step; thereby requires in total $O(N^2)$ running time. There exist more elegant implementations using a binary heap or a Fibonacci heap, which leads to respectively $O(|E|\log|N|)$ and $O(|E|+|N|\log|N|)$ running time, where |E| denotes the number of edges, i.e. the number of given pairwise distances. However, a dense graph is essentially a full matrix, i.e. $|E|=O(N^2)$. Therefore the straightforward implementation using the distance matrix is computationally more efficient.

A related question relates to the optimality of the algorithm which computes the MST. It can be shown that, in the worst case, any valid algorithm for constructing the MST must examine the weights of all |E| edges. Therefore, the most efficient algorithm for constructing a MST over a dense graph would require $O(N^2)$ time. The Prim MST construction algorithm satisfies this limit, i.e. it is optimal for this kind of graph. In the case the input graph consists of $|E|=O(N \log N)$ edges, then, the Prim algorithm using Fibonacci heaps requires $O(|E|)$ running time, thereby this choice is the best which can be done (in the asymptotic limit).

After constructing a MST, the path-based distances are computed over the MST, e.g. for every object pair in the set of objects O. This corresponds to FIG. 1 operation 16. The path-based distances $D_{ij}^{path}$ over the graph $\mathcal{G}$ are then set equal to the corresponding path-based distances over the MST constructed over the graph $\mathcal{G}$ (FIG. 1 operation 18).

A straightforward algorithm for computing the path-based distances in the MST entails performing a Depth First Search (DFS) from each node to compute the path-based distances by keeping the track of the largest distance between the initial node and each of the traversed nodes. A single run of DFS requires $O(N)$ running time and thus the total time will be $O(N^2)$. However, this algorithm visits some edges multiple times which introduces unnecessary extra computation.

With reference to Algorithm 1, disclosed herein is a more efficient algorithm which works based on identifying the list of nodes (components) that should be treated similarly, and thereby avoids unnecessary redundancy in traversing the edges. The nodes inside a list share the same path-based distance to the external nodes. The disclosed algorithm uses the following data structures: (1) component_list which is a list of lists, wherein each list contains the set of nodes (objects) that are treated similarly, i.e. they have the same path-based distance to an external node; and (2) component_ID which is an N-dimensional vector containing the identification (ID) of the (latest) list each object belongs to. The lists are constructed in a dynamic approach from small to large. The algorithm, at each step i, pops out an unselected edge with smallest weight in the tree. For this purpose the vector of the edge weights (i.e. treeWeight) is assumed to have been sorted in advance. This sorting step can be performed with a running time of O(N log N) using a standard algorithm such as quick sort. The nodes associated to the edges are arranged according to the ordering of treeWeight and are stored in treeInd.

---
Algorithm 1 All pair path based distance measures
over a minimum spanning treee (MST)
---
Require: A minimum spanning tree (MST) characterized by:
    (i) treeWeight: vector of edge weights, and
    (ii) treeInd: a N × 2 matrix of edges (nodes of edges).
Ensure: Matrix of pairwise path - based distances $D^{path}$
1.    sorting_ind = argsort(treeWeight)
2.    treeWeight = treeWeight[sorting_ind]
3.    treeInd = treeInd[sorting_ind]
4.    CurID = −1
5.    component_list = [ ]
6.    component_ID = [−1,...,−1]
7.    for i = 0 to N − 1 do
8.      ind1 = treeInd[i, 0]
9.      ind2 = treeInd[i, 1]
10.     first_side_indices = [ind1]
11.     second_side_indices = [ind2]
12.     if component_ID[ind1]! = −1 then
13.       first_side_indices = component_list[component_ID[ind1]]
14.       component_list[component_ID[ind1]] = [ ]
15.     end if
16.     if component_ID[ind2]! = −1 do
17.       second_side_indices = component_list[component_ID[ind2]]
18.       component_list[component_ID[ind2]] = [ ]
19.     end if
20.     CurID = CurID + 1
21.     component_ID[first_side_indices + second_side_indices] = CurID
22.     component_list.append(first_side_indices + second_side_indices)
23.     $D^{path}$[first_side_indices,second_side_list] = treeWeight[i]
24.     $D^{path}$[second_side_indices,first_side_list] = treeWeight[i]
25.    end for
26.    return $D^{path}$
---

Then, the nodes reachable from each side of the edge (i.e. from ind1 and ind2) are selected and stored respectively in first_side_indices and second_side_indices. For this purpose, a vector called component_ID is used, which keeps the ID (index) of the list that each node belongs to. Therefore, first_side_indices is obtained by component_list[component_ID[ind1]] and similarly second_side_indices by component_list[component_ID[ind2]].

Then $D^{path}$ is updated by:

$$D^{path}[\text{first\_side\_indices},\text{second\_side\_list}] = \text{treeWeight}[i]$$

$$D^{path}[\text{second\_side\_indices},\text{first\_side\_list}] = \text{treeWeight}[i] \quad (10)$$

A new list is then constructed and added to component_list by combining first_side_indices and second_side_list. The ID (index) of this new list is used as the ID of its members in component_ID. Algorithm 1 presents the procedure in detail. Sorting the edge weights of the MST requires O(N log N) time and processing the edges and filling out the $D^{path}$ matrix is linear under the assumption that the time for a block update of the matrix is constant. Thereby, the total time of the algorithm is O(N log N).

In order to investigate the efficiency of Algorithm 1, in the following it is shown that, at each step i, (i) the algorithm gives the path-based distance between the subtrees, and (ii) there is not other pair of nodes that their path-based distance is treeWeight[i]. These features are justified by the following two lemmas.

First lemma: The weight of the edge selected at step i, i.e. treeWeight[i], gives the minimum largest distance between the members of first_side_indices and second_side_indices among all routes between them. To demonstrate this lemma, it is first recalled that it has previously been shown herein that the path-based distance between each pair of nodes over a graph is identical to their path-based distance over a MST constructed on the graph. By definition, there is only and exactly one route between each pair of nodes in a tree. Accordingly: (i) treeWeight[i] establishes a route between the nodes in first_side_indices and the nodes in second_side_indices, since the nodes in first_side_indices and second_side_indices are already connected to themselves; and (ii) treeWeight[i] is the largest distance over all the routes from first_side_indices to second_side_indices and vice versa, since the edges are picked in order according their weights and there is no other route connecting the two lists.

Second lemma: At each step i of Algorithm 1, there exist no other pair of nodes that their path-based distance is represented by $e_i$ (whose weight is treeWeight[i]). To show this, we assume that there is such a pair of nodes whose path-based distances is represented by $e_i$, and then prove that this situation yields a contradiction. Let p be a node which is not included in neither first_side_indices nor second_side_indices but its path-based distance to some node q (might be in first_side_indices or in second_side_indices or none) is represented by $e_i$. Under this assumption, the route between p and q must encompass $e_i$, i.e. p is connected (directly or indirectly) to one of the sides (end points) of $e_i$ (called IND). Since $e_i$ contains the largest weight of the route, therefore all the intermediate edges between p and IND have smaller weights and have been already selected at earlier steps. Whenever the algorithm selects an edge, it combines the components corresponding to the two sides of the edge and builds a larger component. Therefore, p and IND must be already combined in a unique component (before step i), since all the intermediate edges between them have smaller weight than treeWeight[i], thus are visited earlier. This is a contradiction with the initial assumption, therefore the lemma is proven.

Path-based measures for sparse graphs are next considered. A set of objects O represented by a sparse graph $\mathcal{G}$ may arise in various practical situations, such as data stream mining, in which an object is localized with respect to only a few other objects, or in other words a restricted number of pairwise distances is available for each object. In such cases, the distance matrix D is sparse. For such cases, there are more efficient algorithms than the Prim algorithm to construct a MST. For sparse graphs, the number of edges is proportional to the number of nodes, i.e. |E|=O(N). here, MST construction algorithms that work based on edges rather than nodes are more efficient. The Boruvka and Kruskal MST construction algorithms are examples of such algorithms, where the running times of both is O(|E|log N). Therefore, for sparse graphs, i.e. where |E|=O(N), the running time amounts to O(N log N) when using the Boruvka or Kruskal MST construction algorithm.

With the MST for the sparse graph constructed, computation of the path-based distances in the MST are next considered. For dense graphs, calculation of path-based distances involves first computing a MST and then extracting the path-based distances from the tree via Algorithm 1. However, this algorithm is similar to Kruskal, i.e. it first sorts the edges and then connects the the subtrees (called component in Algorithm 1) with minimal mutual distances to build larger subtrees. The edge connecting the two candidate subtrees essentially indicates the largest distance between the nodes of the first and the second subtrees. Therefore, for sparse graphs a similar result can be obtained by running an adapted Kruskal and whenever the two subtrees $T_p$ and $T_q$ are combined, simultaneously, $D^{path}$ is updated by the weight of the connecting edge (similar to Expression (10)). The total running time will be, thus, O(N log N).

Figure 4:
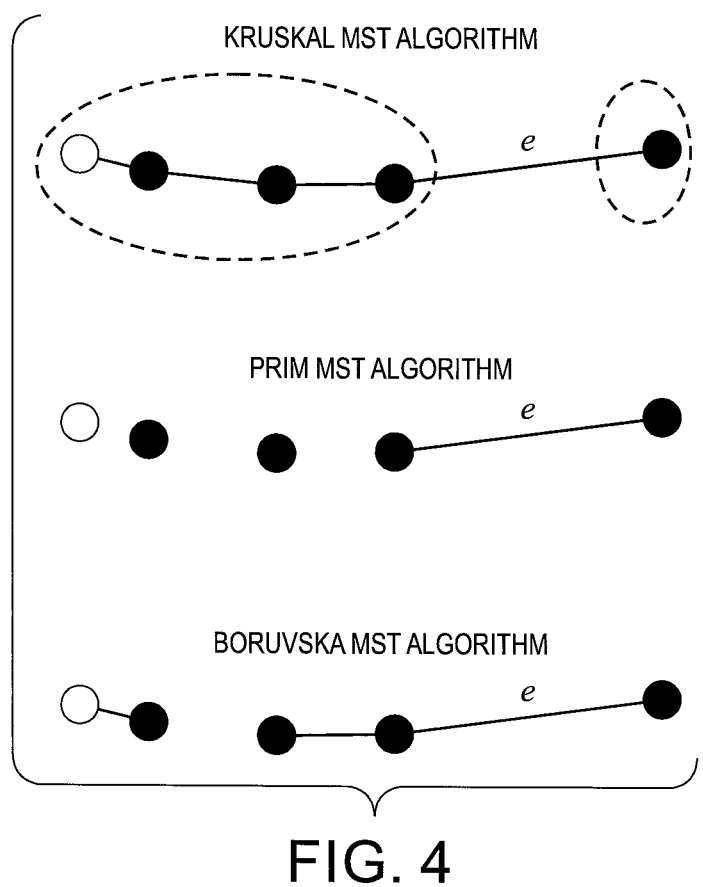
FIG. 4 diagrammatically shows an illustrative set of nodes in an undirected graph referenced in discussing some suitable minimum spanning tree generation algorithms.
Figure 5:
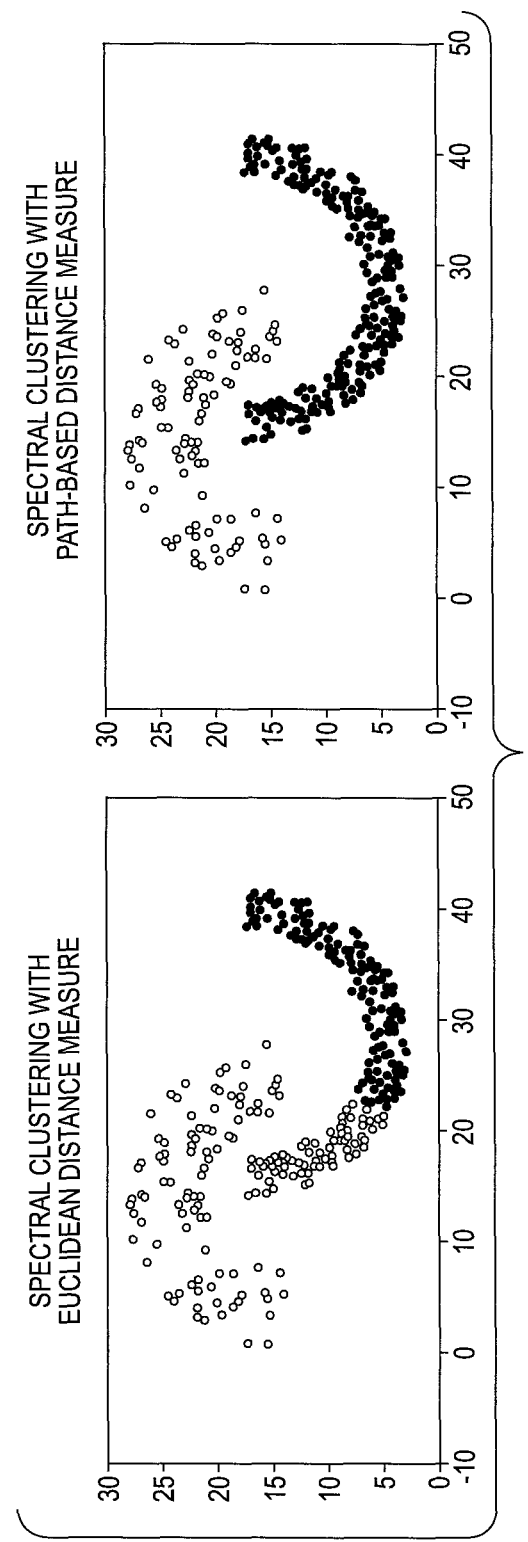
FIGS. 5-8 present experimental spectral clustering results described herein that were performed using the path-based distance measure component of FIG. 1 and (for comparison) using a Euclidean distance measure.
Figure 6:
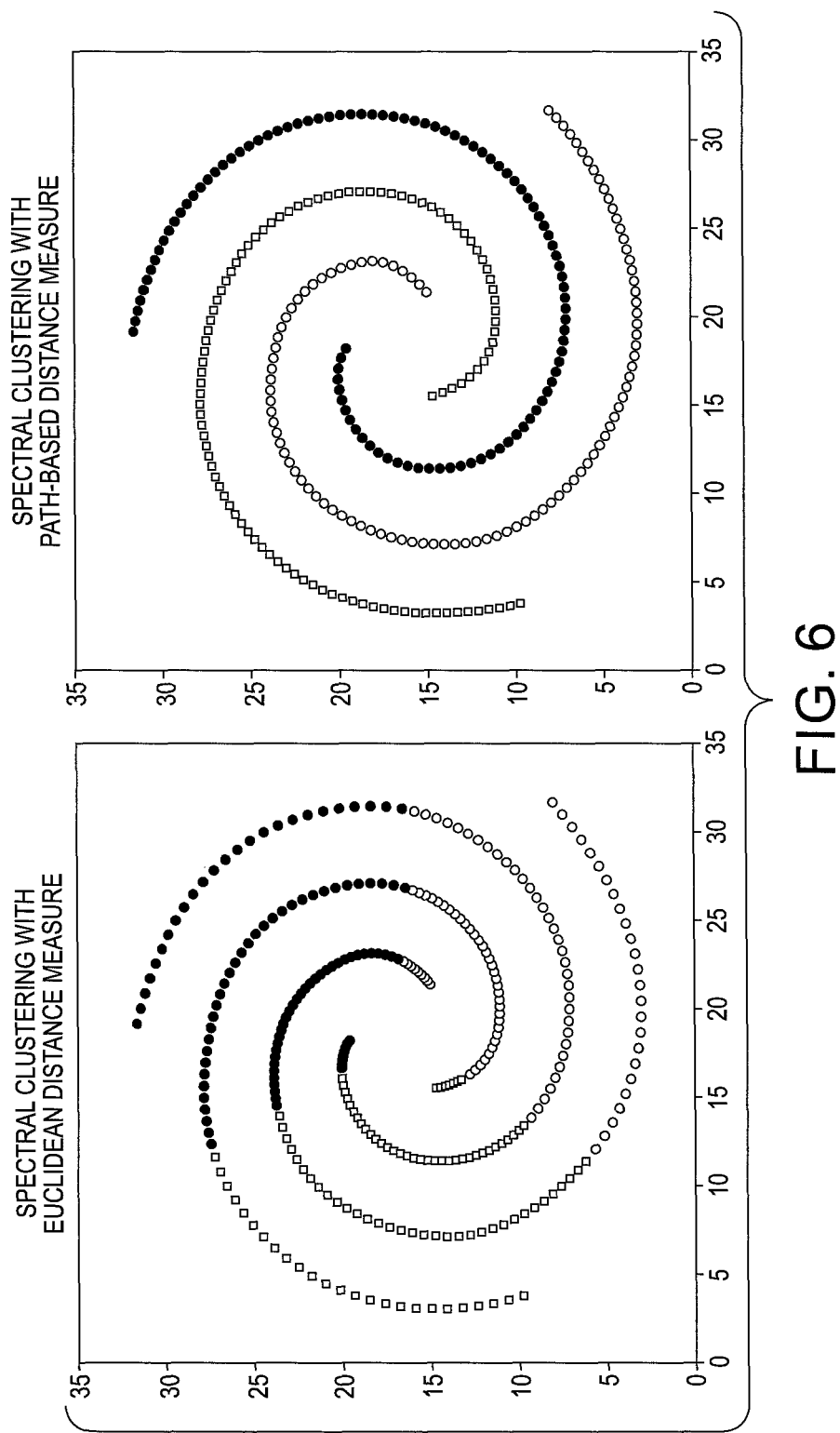

With reference to FIG. 4, the choices of MST construction algorithm presented here as illustrative examples, namely the Kruskal, Prim, and Boruvska MST construction algorithms, are further comparatively considered. Consider the collection of subtrees $\{T_p\}$. In order to compute $D_{ij}^{path}$, the subtrees including i and j are expanded until the new subtree contains both nodes i and j. An algorithm like Kruskal immediately after combining the two base subtrees can compute the path-based distance between the nodes of the first and the second subtrees (FIG. 4, top diagram). The reason is that the new edge represents the largest weight among all the edges of the subtrees. However, this is not the case for the Prim algorithm, as an early edge might have the largest weight in the graph (FIG. 4, middle diagram). Therefore computing the path-based distance after combining the subtrees is not straightforward and requires some additional computation to find the edge with largest weight at each step. For this reason a two-step procedure is disclosed herein as an illustrative embodiment when using the Prim algorithm for dense graphs.

The Boruvka algorithm could be used instead of the Kruskal algorithm to compute the path-based distances: whenever some subtree $T_p$ is connected to the subtree $T_q$ which is nearest to it, the respective edge weight indicates the path-based distance between the nodes in $T_p$ and those in $T_q$. However, for the Boruvka algorithm, although the connecting edge identifies the path-based distance between the base subtrees, there might nonetheless exist some other pair of nodes for which this edge represents the path-based distance but they are not included yet in the base subtrees. An example is shown in FIG. 4, bottom diagram, where the edge e represents the path-based distance between the rightmost node and the rest of the graph. However, when Boruvka picks e, the base subtrees are not grown enough yet to include all the necessary nodes, i.e. e represents the path-based distance between the rightmost node in FIG. 4, bottom diagram, and few others.

Figure 7:
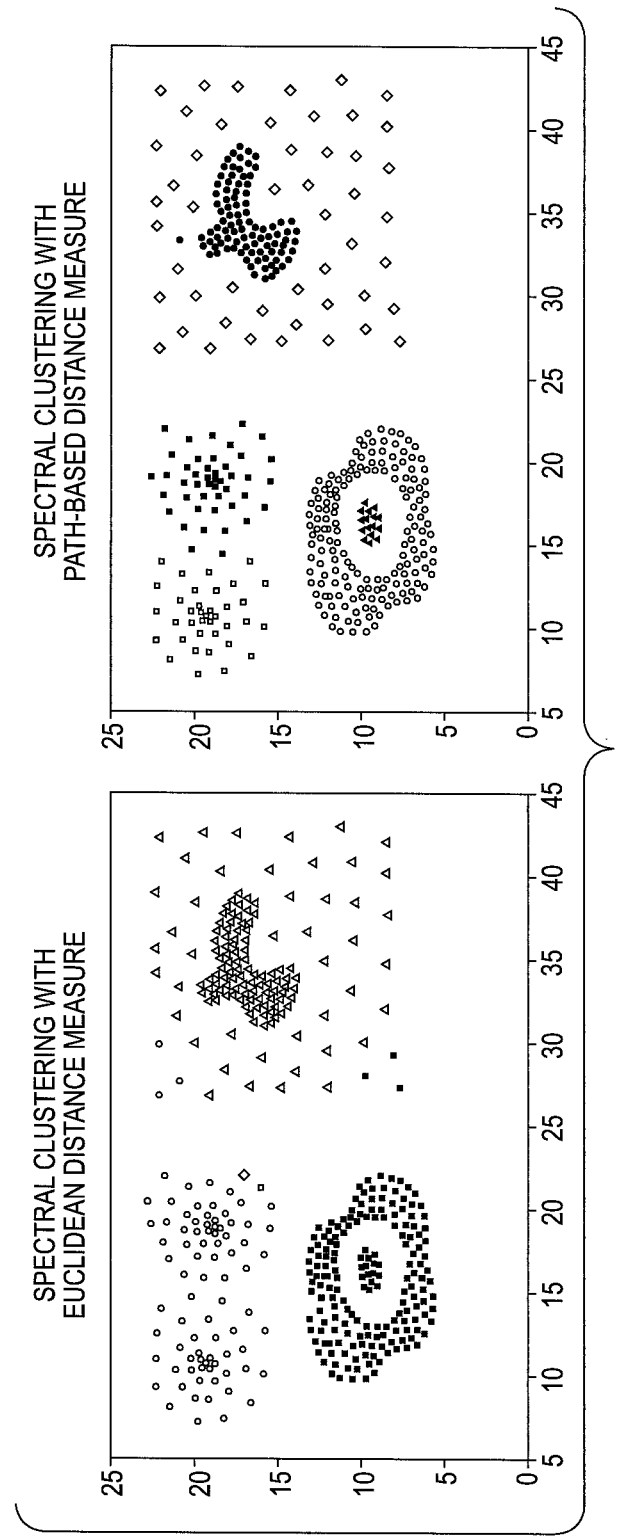
Figure 8:
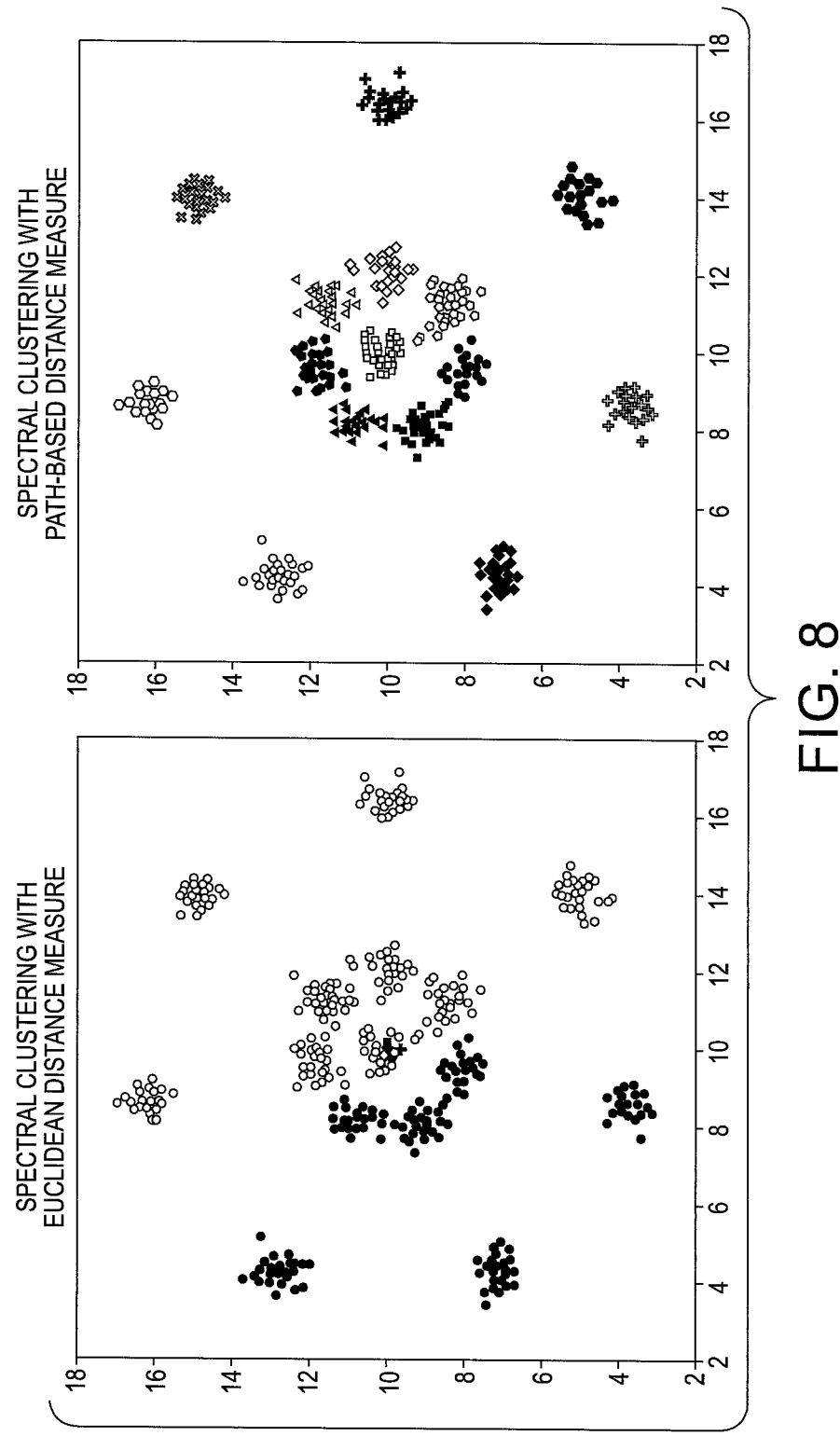

With reference now to FIGS. 5-8, some experimental spectral clustering results are presented, which demonstrate examples of the application of the path-based distance measure to capture the underlying structures in data. For comparative purposes, for each dataset a matrix of Euclidean pairwise distances D was computed by $D_{ij}=\|x_i-x_j\|_2^2$. To performs spectral clustering, these distances are then converted to similarity matrix elements. Spectral clustering sometimes uses a Gaussian kernel to convert the pairwise distances to similarities, i.e. $A_{ij}=\exp(-D_{ij}/\sigma)$, where $\sigma$ is a free parameter which should be fixed in advance. However choosing an appropriate value for $\sigma$ can be a non-trivial task. To select $\sigma$, prior knowledge about the shape and the type of clusters is preferably utilized, which is not available or practical in some applications. To avoid this, in the spectral clustering disclosed herein the operation 22 (see FIG. 1) is employed, in which a nonparametric transformation of the form:

$$A_{ij}=\delta-D_{ij}^{path} \quad (11)$$

is employed, where $\delta$ is a shift parameter. In the illustrative embodiments, $\delta$ is set as follows:

$$\delta = \max_{i,j \in O}\left(D_{ij}^{path}\right) + \min_{i,j \in O}\left(D_{ij}^{path}\right) \quad (12)$$

so that the range of $A_{ij}$ is the same as the range of $D_{ij}$. Notice that no free parameter is involved in computing the similarity matrix in this way. Spectral clustering is then applied to the similarity matrix (operation 30 of FIG. 1) to discover the structure in the data. The results of this spectral clustering, using the Euclidean distance $D_{ij}=\|x_i-x_j\|_2^2$, is presented in the left-hand plots of FIGS. 5-8 four respective data sets O, each seen to have distinct structure with respect to one another. It is observed that the spectral clustering using Euclidean distances fails to capture the inherent structure in each of the cases shown in FIGS. 5-8. For example, in the dataset of FIG. 5 the structure includes two spaced-apart hemispherical structures—however, the clustering using Euclidean distances (left-hand side) finds two clusters in which one cluster includes one of the hemispheres but also a portion of the second, spaced apart hemisphere. Likewise in the example of FIG. 6, the data set comprises distinct spiral arms which intuitively each correspond to a cluster—however, the spectral clustering using Euclidean distances breaks these spiral arms into different clusters. In the examples of FIGS. 7 and 8, the spectral clustering with Euclidean distances fails to distinguish different, spaced-apart structures in the data sets as separate and distinct clusters. As seen in FIG. 8, for example, the data set has about a dozen spaced apart structural regions, but the spectral clustering with Euclidean distances groups the data into only two sub-sets (clusters).

With continuing reference to FIGS. 5-8, to improve on these results, the spectral clustering is repeated using the path-based distance matrix $D^{path}$, which is then converted to a similarity matrix using the same nonparametric transformation of Expressions (11) and (12) followed by applying spectral clustering. The results for the four data sets of FIGS. 5-8 are shown in the right-hand plots. It is seen that computing path-based distances enable the clustering algorithm to better identify and extract the structures. In other words, the clusters found by this approach align well with the apparent structure of the data: in the example of FIG. 5 two clusters corresponding to the two hemispherical regions are found; in FIG. 6 the clusters correspond well to the spiral arms; and in FIGS. 7 and 8 the clusters again correspond with the apparent structures, with the example of FIG. 8 finding fifteen clusters (compared with only two clusters for the Euclidean distance clustering).

The results presented with reference to FIGS. 5-8 demonstrate improvement in spectral clustering attainable using the path-based distance as compared with the Euclidean distance. These results could in principle be obtained using any technique for computing the path-based distances, such as using a variant of the Floyd-Warshall algorithm. However, the running time of this algorithm is $O(N^3)$, which may be impractical for processing large data sets. The disclosed approach of leveraging a MST to efficiently compute path-based distances enables use of these distances in problems for which the path-based distance might previously have been deemed computationally impractical.

With reference now to Tables 1 and 2, in further experiments the computational efficiency of the disclosed MST-based approach for computing path-based distances is compared with the Floyd-Warshall algorithm-based approach. Table 1 defines the data sets that are tested, including the news groups in each data set and its size. Table 2 compares the running times of the MST-based path-based distance computation of FIG. 1 with running times for computing the path-based distances using the Floyd-Warshall algorithm, for the five different data sets defined in Table 1. Note that no spectral clustering is performed in the experiments reported in Tables 1 and 2—these results amount to the time required for generating the matrix $D^{path}$, which would then be converted to a similarity matrix as per Expressions (11) and (12) followed by the spectral clustering.

TABLE 1

Data set definitions

| Data set | Newsgroups included | Size |
| --- | --- | --- |
| COMP | comp.graphics, comp.os.ms-windows.misc, comp.sys.ibm.pc.hardware, comp.sys.mac.hardware, comp.windows.x | 2936 |
| REC | rec.autos, rec.motorcycles, rec.sport.baseball, rec.sport.hockey | 2389 |
| SCI | sci.crypt, sci.electronics, sci.med, sci.space' | 2373 |
| TALK | talk.politics.guns, talk.politics.mideast, talk.politics.misc, talk.religion.misc | 1952 |
| REST | alt.atheism, misc.forsale, soc.religion.christian | 1664 |

It is seen from Table 2 that the MST-based path-based distance computation approach of FIG. 1 significantly outperforms the Floyd-Warshall approach—on average it performs about four times faster. Note that both algorithms return exactly the same outputs, although the Floyd-Warshall algorithm might incur numerical issues. Moreover, Table 2 demonstrates good scalability of the MST-based path-based distance computation. Note that for the largest data sets (COMP, REC, and SCI) the improvement is a factor of four compared with the Floyd-Warshall approach (i.e. run time for the MST-based path-based distance computation is 25% or less of the Floyd-Warshall approach), whereas the run time improvement is less for the smaller data sets (TALK and REST) for which the improvement is a factor of three (32% of the Floyd-Warshall approach). This is believed to be a consequence of the scalability obtained because the MST is computed only once, regardless of the number of pairs for which the path-based distance is computed. This scalability has significance for "big data" applications in which the data set is very large.

TABLE 2

Running times for generating $D^{path}$

| Data set | Run time (MST-based) | Run time (Floyd-Warshall) | MST run time/ F-W run time |
| --- | --- | --- | --- |
| COMP | 173.43 sec | 758.59 sec | 23% |
| REC | 94.94 sec | 382.27 sec | 25% |
| SCI | 92.98 sec | 380.74 sec | 24% |
| TALK | 89.35 sec | 281.87 sec | 32% |
| REST | 56.49 sec | 177.24 sec | 32% |

Appropriate data representation is an important aspect of machine learning tasks such as classification and clustering. Some non-limiting examples of such tasks include social media analysis, image segmentation, tweet categorization, community detection, knowledge management and network analysis. The choice of distance (similarity) measure strongly affects clustering performance. The path-based distance measure effectively captures the arbitrary shape of underlying structure (see FIGS. 5-8). In approaches disclosed herein in which a nonparametric transformation is used to generate the similarity matrix from the distances, this capture of the underlying structure is performed without fixing any parameter in advance.

However, the chosen measure also must be practical, i.e. it must be able to be computed in an efficient manner. Existing techniques for computing path-based distance measures are inefficient, which restricts its applicability to small-scale problems. By contrast, the MST-based path-based distance computation disclosed herein greatly improves computational efficiency (see Table 2), which opens up the path-based distance measure for use in diverse "big data" tasks. The MST-based path-based distance computation is also highly scalable, because the MST is constructed only once regardless of how many path-based distances need to be computed.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An apparatus for performing clustering of documents, the apparatus comprising:

a distance measure component configured to compute a path-based distance $$D_{ij}^{path} = \min_{r \in \mathcal{R}_{ij}(O)} \left\{ \max_{1 \le l \le |r|} e_l \right\}$$

between a document i and a document j in an undirected graph $\mathcal{G}(O, E)$ that includes one or more cycles, where O is a set of N documents including the document i and the document j and E is a set of edges connecting pairs of documents in the undirected graph $\mathcal{G}$ with each edge having an edge weight, and where $\mathcal{R}_{ij}(O)$ is the set of all routes between the document i and the document j in the undirected graph $\mathcal{G}$, the route r comprises a sequence of edges l=1, ..., |r|, and $e_l$ is the edge weight of the $l^{th}$ edge along the route, the distance measure component comprising an electronic data processing device programmed to compute the path-based distance $D_{ij}^{path}$ by operations including (i)

computing a minimum spanning tree over the undirected graph $\mathcal{G}$ and (ii) computing a path-based distance between the document i and the document j in the minimum spanning tree and (iii) setting the path-based distance $D_{ij}^{path}$ between the document i and the document j in the undirected graph $\mathcal{G}$ equal to the path-based distance between the document i and the document j in the minimum spanning tree; and a clustering component configured to construct clusters comprising sub-sets of documents of the set of documents O, the clustering component comprising the electronic data processing device further programmed to perform a clustering process including the operations of invoking the distance measure component to compute path-based distances between pairs of documents of the set of documents O and grouping similar documents into said clusters based on the computed path-based distances.

2. The apparatus of claim 1 wherein the operation (i) comprises:

identifying the undirected graph $\mathcal{G}$ as either a dense graph if the number of edges in the set of edges E is greater than a threshold T or a sparse graph if the number of edges in the set of edges E is at or below the threshold T, where the threshold T is in the range $N<T<N^2$; and computing the minimum spanning tree over the undirected graph $\mathcal{G}$ using the Prim minimum spanning tree construction algorithm if the undirected graph $\mathcal{G}$ is identified as a dense graph; and computing the minimum spanning tree over the undirected graph $\mathcal{G}$ using a variant of Kruskal minimum spanning tree construction algorithm adapted to simultaneously construct the minimum spanning tree and compute the path-based distances if the undirected graph $\mathcal{G}$ is identified as a sparse graph.

3. The apparatus of claim 1 wherein the electronic data processing device is further programmed to:

repeating the operations (ii) and (iii), but not repeating the operation (i), in order to compute the path-based distances $D_{ij}^{path}$ for all document pairs in the set of documents O;

storing via a non-transitory storage medium the computed path-based distances $D_{ij}^{path}$ for all document pairs in the set of documents O; and responding to a request for the path-based distance between two input documents by retrieving the stored path-based distance $D_{ij}^{path}$ between the two input documents from the non-transitory storage medium.

4. The apparatus of claim 1 wherein the operation (ii) comprises:

computing the path-based distance between the document i and the document j in the minimum spanning tree as $$\max_{1\leq l\leq |r_{ij}|} \{e_l\}$$

where $r_{ij}$ is the only path from the document i to the document j in the minimum spanning tree and the only path $r_{ij}$ includes $|r_{ij}|$ edges with $e_l$ denoting the edge weight of the $l^{th}$ edge along the only path $r_{ij}$.

5. The apparatus of claim 1 further comprising:

a document retrieval component configured to retrieve one or more documents from the set of documents O which are most similar to a query document of the set of documents O, the document retrieval component comprising an electronic data processing device programmed to perform a retrieval process including the operations of invoking the distance measure component to compute path-based distances between the query document and other documents of the set of documents O and retrieving the one or more documents most similar to the query document as measured by the computed path-based distances.

6. The apparatus of claim 1 wherein the clustering process includes invoking the distance measure component to compute the path-based distances $D_{ij}^{path}$ for all document pairs in the set of documents O, and the operation of grouping similar documents into said clusters includes:

constructing an N×N similarity matrix A from the path-based distances $D_{ij}^{path}$ for all document pairs in the set of documents O.

7. The apparatus of claim 6 wherein the operation of constructing the N×N similarity matrix A comprises:

constructing an N×N path-based distances matrix $D^{path}$ whose elements include the path-based distances $D_{ij}^{path}$ computed by invoking the distance measure component for all document pairs (i,j) in the set of documents O; and constructing the N×N similarity matrix A with elements $A_{ij}$ defined by the nonparametric transformation $A_{ij}=\delta-D_{ij}^{path}$ where $\delta$ is a shift parameter.

8. The apparatus of claim 7 wherein the shift parameter $\delta$ is:

$$\delta = \max_{i,j\in O}(D_{ij}^{path}) + \min_{i,j\in O}(D_{ij}^{path}).$$

9. The apparatus of claim 6 wherein the operation of grouping similar documents into said clusters further includes:

performing spectral clustering on the similarity matrix A to generate said clusters.

10. A method of performing clustering of documents, the method comprising:

computing path-based distances between pairs of documents in an undirected graph $\mathcal{G}$ (O, E) where O is a set of N documents and E is a set of edges connecting pairs of documents in the undirected graph $\mathcal{G}$ with each edge having an edge weight and the path-based distance $D_{ij}^{path}$ between a document i and a document j is defined as:

$$D_{ij}^{path} = \min_{r\in\mathcal{R}_{ij}(O)} \left\{\max_{1\leq l\leq |r|} e_l\right\}$$

where $\mathcal{R}_{ij}(O)$ is the set of all routes between the document i and the document j in the undirected graph $\mathcal{G}$, the route r comprises a sequence of edges $l=1,\ldots,|r|$, and $e_l$ is the edge weight of the $l^{th}$ edge along the route, the computing of the path-based distance $D_{ij}^{path}$ comprising:

(i) computing a minimum spanning tree over the undirected graph $\mathcal{G}$;

(ii) computing a path-based distance between the document i and the document j in the minimum spanning tree; and (iii) setting the path-based distance $D_{ij}^{path}$ between the document i and the document j in the undirected graph $\mathcal{G}$ equal to the path-based distance between the document i and the document j in the minimum spanning tree; and constructing clusters comprising sub-sets of documents of the set of documents O by performing a clustering process operating to group similar documents into said clusters based on the computed path-based distances;

wherein the operations (i), (ii), and (iii) and the clustering are performed by an electronic data processing device programmed to perform the operations (i), (ii), and (iii) and the clustering.

11. The method of claim 10 wherein the operation (i) comprises:

identifying the undirected graph $\mathcal{G}$ as either a dense graph if the number of edges in the set of edges E is greater than a threshold T or a sparse graph if the number of edges in the set of edges E is at or below the threshold T, where the threshold T is in the range $N<T<N^2$; and computing the minimum spanning tree over the undirected graph $\mathcal{G}$ using the Prim minimum spanning tree construction algorithm if the undirected graph $\mathcal{G}$ is identified as a dense graph; and computing the minimum spanning tree over the undirected graph $\mathcal{G}$ using an adapted variant of Kruskal minimum spanning tree construction algorithm if the undirected graph $\mathcal{G}$ is identified as a sparse graph.

12. The method of claim 10 wherein the operation (ii) comprises:

computing the path-based distance between the document i and the document j in the minimum spanning tree as $$\max_{1 \le l \le |r_{ij}|} \{e_l\}$$

where $r_{ij}$ is the only path from the document i to the document j in the minimum spanning tree and the only path $r_{ij}$ includes $|r_{ij}|$ edges with $e_l$ denoting the edge weight of the $l^{th}$ edge along the only path $r_{ij}$.

13. The method of claim 10 further comprising:

(iv) repeating the operations (ii) and (iii), but not repeating the operation (i), to compute the path-based distances $D_{ij}^{path}$ for all document pairs in the set of documents O;

wherein the operation (iv) is performed by the electronic data processing device further programmed to perform the operation (iv).

14. The method of claim 13 wherein the clustering comprises:

performing spectral clustering on a similarity matrix constructed using the path-based distances $D_{ij}^{path}$ for all document pairs in the set of documents O to construct clusters comprising sub-sets of documents of the set of documents O.

15. A non-transitory storage medium encoding instructions readable and executable by an electronic data processing device to perform a method for performing clustering of documents, the method comprising:

computing path-based distances $$D_{ij}^{path} = \min_{r \in \mathcal{R}_{ij}(O)} \left\{ \max_{1 \le l \le |r|} e_l \right\}$$

between pairs of nodes i and j in an undirected graph $\mathcal{G}$ (O, E) having at least one cycle and comprising a set of nodes O representing documents and a set of edges E connecting pairs of nodes in the undirected graph with each edge having an edge weight, and where $\mathcal{R}_{ij}(O)$ is the set of all routes between the node i and the node j in the undirected graph $\mathcal{G}$, the route r comprises a sequence of edges $l=1, \ldots, |r|$, and $e_l$ is the edge weight of the $l^{th}$ edge along the route, the computing of the path-based distances comprising:

(i) computing a minimum spanning tree over the undirected graph;

(ii) computing a path-based distance between the pair of nodes in the minimum spanning tree; and (iii) setting the path-based distance between the documents represented by the pair of nodes i and j in the undirected graph equal to the path-based distance between the pair of nodes in the minimum spanning tree; and constructing clusters comprising sub-sets of the documents represented by the set of nodes O by performing a clustering process operating to group similar nodes into said clusters based on the computed path-based distances.

16. The non-transitory storage medium of claim 15 wherein the operation (i) comprises:

identifying the undirected graph as either a dense graph if the number of edges in the set of edges is greater than a threshold or a sparse graph if the number of edges in the set of edges is at or below the threshold, where the threshold greater than the number of nodes in the set of nodes and is less than the square of the number of nodes in the set of nodes; and computing the minimum spanning tree over the undirected graph using the Prim minimum spanning tree construction algorithm if the undirected graph is identified as a dense graph; and computing the minimum spanning tree over the undirected graph using the Kruskal minimum spanning tree construction algorithm if the undirected graph is identified as a sparse graph.

17. The non-transitory storage medium of claim 15 wherein the operation (ii) comprises:

computing the path-based distance between each pair of nodes i and j in the minimum spanning tree as the largest edge weight along the only path between the pair of nodes i and j in the minimum spanning tree.

18. The non-transitory storage medium of claim 15 wherein the method performed by the electronic data processing device executing the encoded instructions further comprises:

repeating the operations (ii) and (iii), but not repeating the operation (i), in order to compute the path-based distance for every pair of nodes in the undirected graph.

* * * * *